(12) United States Patent
Gwak et al.

(10) Patent No.: US 11,277,788 B2
(45) Date of Patent: Mar. 15, 2022

(54) SCAN METHOD IN NEAR-FIELD WIRELESS COMMUNICATION NETWORK AND ELECTRONIC DEVICE FOR IMPLEMENTING SAME

(71) Applicant: Samsung Electronics Co., Ltd., Gyeonggi-do (KR)

(72) Inventors: Hogil Gwak, Gyeonggi-do (KR); Sinjae Kang, Gyeonggi-do (KR); Jongkyu Lee, Seoul (KR); Inhwan Hwang, Gyeonggi-do (KR); Doosuk Kang, Gyeonggi-do (KR); Yongjoon Jeon, Gyeonggi-do (KR)

(73) Assignee: Samsung Electonics Co., Ltd

( * ) Notice: Subject to any disclaimer, the term of this patent is extended or adjusted under 35 U.S.C. 154(b) by 518 days.

(21) Appl. No.: 16/321,713

(22) PCT Filed: Jul. 27, 2017

(86) PCT No.: PCT/KR2017/008118
§ 371 (c)(1),
(2) Date: Jan. 29, 2019

(87) PCT Pub. No.: WO2018/026138
PCT Pub. Date: Feb. 8, 2018

(65) Prior Publication Data
US 2021/0282075 A1     Sep. 9, 2021

(30) Foreign Application Priority Data

Aug. 1, 2016 (KR) .................. 10-2016-0098083

(51) Int. Cl.
*H04W 4/00* (2018.01)
*H04W 48/16* (2009.01)
(Continued)

(52) U.S. Cl.
CPC ............. *H04W 48/16* (2013.01); *H04W 4/80* (2018.02); *H04W 8/005* (2013.01); *H04W 48/20* (2013.01);
(Continued)

(58) Field of Classification Search
CPC ......... H04W 48/16; H04W 4/80; H04W 8/05; H04W 48/20; H04W 52/0206;
(Continued)

(56) References Cited

U.S. PATENT DOCUMENTS 7,907,945 B2 * 3/2011 Deprun ................. H04W 48/10
455/432.1
8,295,811 B1 * 10/2012 Gailloux ........... H04M 3/42144
455/411

(Continued)

FOREIGN PATENT DOCUMENTS

| KR | 1020040070096 | 8/2004 |
| KR | 1020060025444 | 3/2006 |

(Continued)

OTHER PUBLICATIONS

PCT/ISA/210 Search Report issued on PCT/KR2017/008118 (pp. 5).
PCT/ISA/237 Written Opinion issued on PCT/KR2017/008118 (pp. 5).

*Primary Examiner* — Marceau Milord
(74) *Attorney, Agent, or Firm* — The Farrell Law Firm, P.C.

(57) ABSTRACT

According to various embodiments of the present invention, an electronic device includes: a display; a near-field wireless communication circuit configured to repetitively transmit a scan signal for finding an access point; a processor electrically connected to the communication circuit; and a memory electrically connected to the processor, wherein, during execution, the memory can store commands for allowing the
(Continued)

processor to set a transmission period of the scan signal as a first period, to determine whether it is necessary to adjust a scan frequency on the basis of a trigger for turning on the display when the display is turned on, to maintain the transmission period as the first period when the scan frequency adjustment is not necessary, and to change the transmission frequency to a second period shorter than the first period, when the scan frequency adjustment is necessary.

15 Claims, 8 Drawing Sheets

(51) Int. Cl.
  *H04W 4/80* (2018.01)
  *H04W 8/00* (2009.01)
  *H04W 48/20* (2009.01)
  *H04W 52/02* (2009.01)

(52) U.S. Cl.
  CPC ... *H04W 52/0206* (2013.01); *H04W 52/0229* (2013.01)

(58) Field of Classification Search
  CPC ............ H04W 52/0229; H04W 84/12; H04W 52/0254; Y02D 70/142; Y02D 70/144
  USPC ................................ 370/329, 311, 252, 338
  See application file for complete search history.

(56) References Cited

U.S. PATENT DOCUMENTS

| | | | |
|---|---|---|---|
| 8,452,281 B2 | 5/2013 | Salomone | |
| 10,681,628 B2* | 6/2020 | Woo ...................... | H04W 48/20 |
| 2004/0153676 A1 | 8/2004 | Krantz et al. | |
| 2004/0176024 A1* | 9/2004 | Hsu ....................... | H04W 48/10 455/3.04 |
| 2005/0105501 A1* | 5/2005 | Oura ..................... | H04W 28/18 370/338 |
| 2006/0128382 A1* | 6/2006 | Kim ...................... | H04W 24/00 455/434 |
| 2007/0143499 A1* | 6/2007 | Chang ..................... | H04L 67/18 709/245 |
| 2008/0014934 A1 | 1/2008 | Balasubramanian et al. | |
| 2008/0181187 A1* | 7/2008 | Scott ....................... | H04L 67/16 370/338 |
| 2010/0080134 A1* | 4/2010 | Maniatopoulos ..... | H04W 48/16 370/252 |
| 2010/0105332 A1* | 4/2010 | McHenry .............. | H04W 16/14 455/62 |
| 2010/0173586 A1* | 7/2010 | McHenry ............. | H04L 27/0006 455/62 |
| 2010/0177673 A1* | 7/2010 | Yoon .................. | H04W 52/0274 370/311 |
| 2010/0273486 A1* | 10/2010 | Kharia ............. | H04W 52/0261 455/436 |
| 2010/0303051 A1* | 12/2010 | Umeuchi ............. | H04W 48/16 370/338 |
| 2011/0075598 A1* | 3/2011 | Jalfon ............... | H04W 52/0209 370/311 |
| 2011/0158143 A1* | 6/2011 | Yun ................... | H04W 52/0251 370/311 |
| 2011/0273998 A1 | 11/2011 | Mudrick et al. | |
| 2012/0250731 A1* | 10/2012 | Taghavi Nasrabadi ...................... | H04W 88/06 375/147 |
| 2013/0107777 A1 | 5/2013 | Woo | |
| 2014/0073288 A1* | 3/2014 | Velasco ................. | H04W 12/06 455/411 |
| 2014/0073289 A1* | 3/2014 | Velasco .................. | H04W 4/02 455/411 |
| 2014/0105086 A1 | 4/2014 | Chhabra et al. | |
| 2014/0287751 A1* | 9/2014 | Lee ....................... | H04L 47/225 455/434 |
| 2016/0241998 A1* | 8/2016 | Choi ...................... | H04W 4/021 |
| 2017/0201942 A1* | 7/2017 | Mathews .......... | H04M 1/72412 |
| 2018/0302860 A1* | 10/2018 | Woo ...................... | H04W 48/20 |

FOREIGN PATENT DOCUMENTS

| | | |
|---|---|---|
| KR | 1020090039776 | 4/2009 |
| KR | 1020130032312 | 4/2013 |

* cited by examiner

SCAN METHOD IN NEAR-FIELD WIRELESS COMMUNICATION NETWORK AND ELECTRONIC DEVICE FOR IMPLEMENTING SAME

PRIORITY

This application is a National Phase Entry of PCT International Application No. PCT/KR2017/008118 which was filed on Jul. 27, 2017, and claims priority to Korean Patent Application No. 10-2016-0098083, which was filed on Aug. 1, 2016, the content of each of which is incorporated herein by reference.

TECHNICAL FIELD

Various embodiments of the present disclosure relate to an electronic device configured to scan an external device in a wireless local area network and to make a wireless connection therewith.

BACKGROUND ART

An electronic device may have a short-range wireless communication module mounted thereon and may perform a scan operation by using the same, thereby finding an external device (for example, an access point (AP)). The electronic device may display information regarding external devices that have been found such that the user can select one therefrom, and may perform an operation for making a wireless connection with the selected external device. Alternatively, the electronic device may directly select one from the external devices that have been found.

DISCLOSURE OF INVENTION

Technical Problem

A scan operation may generally include a procedure in which an electronic device transmits a scan signal (request signal) to an AP, in order to exchange information between devices, and receives a response signal regarding the same from the AP.

Such a scan operation may be performed repeatedly until a connection with a specific AP is established if the corresponding short-range wireless communication module is activated, and if there is no connection with any AP.

Therefore, when the electronic device provides the user with a specific service for interaction with the user, the scan operation may be repeatedly performed frequently, although such a service may have nothing to do with wireless connection, and this may consume power stored in the battery of the electronic device.

Various embodiments of the present disclosure propose an electronic device configured to improve battery power consumption.

Solution to Problem

Various embodiments of the present disclosure may understand the situation when the display is turned on and may adaptively adjust the frequency of the scan operation on the basis of the same.

In accordance with various embodiments of the present disclosure, an electronic device may include: a display; a short-range wireless communication circuit configured to repeatedly transmit a scan signal for finding an access point; a processor electrically connected to the communication circuit; and a memory electrically connected to the processor. The memory may store instructions that, when executed, cause the processor to set a transmission cycle of the scan signal to be a first cycle, to determine, if the display is turned on, whether a scan frequency needs to be adjusted or not on the basis of a triggering event that has triggered turning on of the display, to maintain the transmission cycle at the first cycle if the scan frequency does not need to be adjusted, and to change the transmission cycle to a second cycle that is shorter than the first cycle if the scan frequency needs to be adjusted.

In accordance with various embodiments of the present disclosure, an electronic device may include: a display; a short-range wireless communication circuit configured to repeatedly transmit a scan signal for finding an access point; a processor electrically connected to the communication circuit; and a memory electrically connected to the processor. The memory may store instructions that, when executed, cause the processor to differentiate a transmission cycle of the scan signal according to whether a screen to be displayed when the display is turned on is a lock screen or not, if the display is turned on while no wireless connection is established with the access point.

In accordance with various embodiments of the present disclosure, a method for scanning an access point by an electronic device may include: periodically transmitting a scan signal for finding an access point at a first cycle; determining, if a display is turned on, whether a scan frequency needs to be adjusted or not on the basis of a triggering event that has triggered turning-on of the display; and maintaining the transmission cycle at the first cycle if the scan frequency does not need to be adjusted and changing the transmission cycle to a second cycle that is shorter than the first cycle if the scan frequency needs to be adjusted.

Advantageous Effects of Invention

Various embodiments of the present disclosure are advantageous in that the frequency of the scan operation for finding an access point, when the display is turned on, is adjusted adaptively on the basis of a specific condition (for example, a triggering event that has triggered turning-on of the display or according to whether the corresponding electronic device has been set to be locked or not), thereby improving battery power consumption.

MODE FOR THE INVENTION

Figure 1:
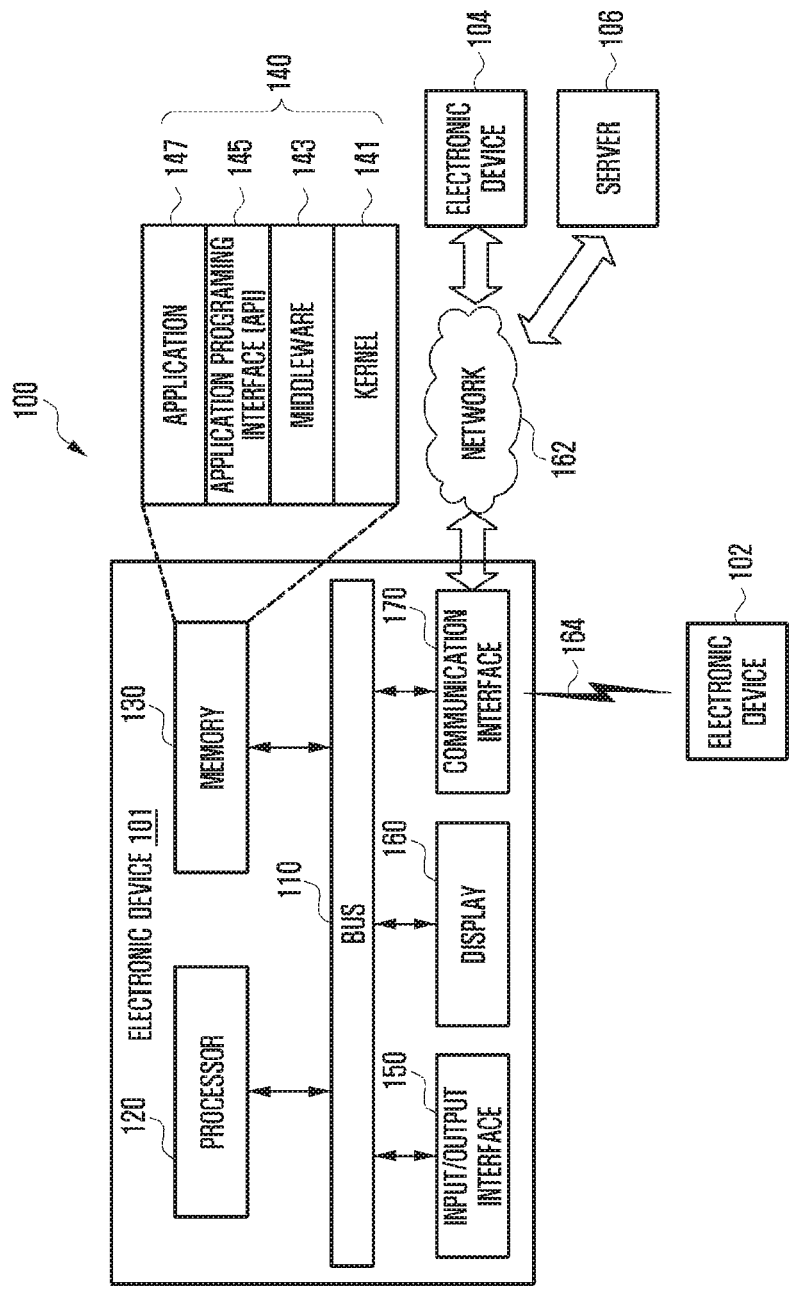
FIG. 1 illustrates an electronic device inside a network environment according to various embodiments.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, singular forms may include plural forms as well unless the context clearly indicates otherwise. In the present disclosure, the expression "A or B" or "at least one of A and/or B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

Electronic devices according to embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) audio layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits). The electronic devices in some embodiments may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices in another embodiment may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like). According to some embodiments, the electronic devices may be further included in furniture or buildings/structures, electronic boards, electronic signature receiving devices, projectors, or various measuring instruments (such as water meters, electricity meters, gas meters, or wave meters, and the like). The electronic devices in various embodiments may be one or more combinations of the above-mentioned devices. The electronic devices in various embodiments may be flexible electronic devices. Also, the electronic device according to the embodiments of this document are not limited to the above-mentioned devices. In this document, the term "user" as used herein may refer to a person who uses an electronic device or may refer to a device (e.g., an artificial intelligence electronic device) which uses an electronic device.

FIG. 1 illustrates a network environment including an electronic device according to an embodiment of the present disclosure. Referring to FIG. 1, a network environment 100 includes an electronic device 101 having a bus 110, a processor 120, a memory 130, an input/output interface 150, a display 160, and a communication interface 170. At least one of the above described components may be omitted from the electronic device 101 or another component may be further included in the electronic device 101. The bus 110 may be a circuit connecting the above described components 120, 130, and 150-170 and transmitting communications (e.g., control messages and/or data) between the above described components. The processor 120 may include one or more of a CPU, an AP, and a communication processor (CP). The processor 120 is capable of controlling at least one of other components of the electronic device 101 and/or processing data or operations related to communication.

The memory 130 may include volatile memory and/or non-volatile memory. The memory 130 is capable of storing data or commands related to at least one of other components of the electronic device 101. The memory 130 is capable of storing software and/or a program module 140. For example, the program module 140 may include a kernel 141, middleware 143, an application programming interface (API) 145, application programs (or applications) 147, etc. The kernel 141, the middleware 143 or at least part of the API 145 may be referred to as an operating system (OS). The kernel 141 is capable of controlling or managing system resources (e.g., the bus 110, the processor 120, the memory 130, etc.) used to execute operations or functions of other programs (e.g., the middleware 143, the API 145, and the application programs 147). The kernel 141 provides an interface capable of allowing the middleware 143, the API 145, and the application programs 147 to access and control/manage the individual components of the electronic device 101.

The middleware 143 may be an interface between the API 145 or the application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, the processor 120, the memory 130, etc.) to at least one of the application programs 147. For example, the middleware 143 processes one or more task requests according to a priority assigned to at least one application program, thereby performing scheduling or load balancing for the task requests. The API 145 may be an interface that is configured to allow the application programs 147 to control functions provided by the kernel 141 or the middleware 143. The API 145 may include at least one interface or function (e.g., instructions) for file control, window control, image process, text control, or the like. The input/output interface 150 is capable of transferring instructions or data, received from the user or external devices, to one or more components of the electronic device 101. The input/output interface 150 is capable of outputting instructions or data, received from one or more components of the electronic device 101, to the user or external devices.

The display 160 may include a liquid crystal display (LCD), a flexible display, a transparent display, a light emitting diode (LED) display, an organic LED (OLED) display, micro-electro-mechanical systems (MEMS) display, an electronic paper display, etc. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen or a user's body. The communication interface 170 is capable of establishing communication between the electronic device 101 and an external device For example, the communication interface 170 is capable of communicating with an external device connected to a network 162 via wired or wireless communication.

Wireless communication may employ a cellular communication protocol such as long-term evolution (LTE), LTE Advance (LTE-A), code division multiple access (CDMA), wideband CDMA (WCDMA), universal mobile telecommunications system (UMTS), wireless broadband (WiBro), and global system for mobile communication (GSM). Wireless communication may also include a short-range wireless communication link 164. The short-wireless communication link 164 may include at least one of wireless fidelity (Wi-Fi), Bluetooth (BT), near field communication (NFC), magnetic secure transmission (MST), and global navigation satellite system (GNSS). The GNSS may include at least one of GPS, global navigation satellite system (Glonass), Beidou GNSS (Beidou), Galileo, the European global satellite-based navigation system, according to GNSS using areas, bandwidths, etc. In the present disclosure, the terms "GPS" and "GNSS" may be used interchangeably. Wired communication may include at least one of universal serial bus (USB), high definition multimedia interface (HDMI), recommended standard 232 (RS-232), and plain old telephone service (POTS). The network 162 may include at least one of a telecommunications network, e.g., a computer network (e.g., local area network (LAN) or wide area network (WAN)), the Internet, and a telephone network.

A first external electronic device 102 and a second external electronic device 104 are each identical to or different from the electronic device 101. According to an embodiment, a server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from another electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
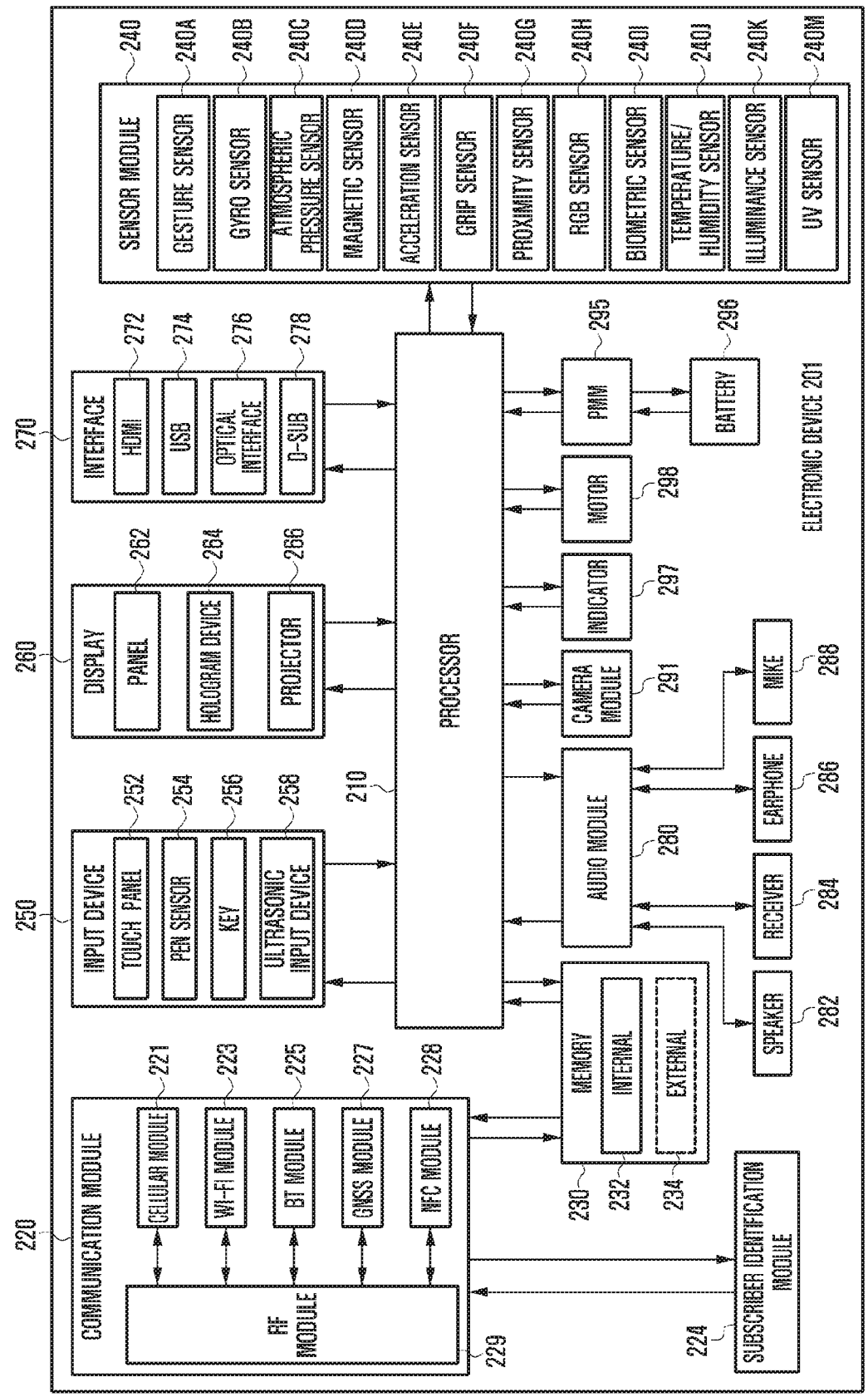
FIG. 2 is a block diagram of an electronic device according to various embodiments.

FIG. 2 is a block diagram showing a configuration of an electronic device according to an embodiment of the present disclosure. Referring to FIG. 2, an electronic device 201 may include a part or all of the components in the electronic device 101 shown in FIG. 1. The electronic device 201 may include one or more processors 210 (e.g., APs), a communication module 220, a subscriber identification module (SIM) 224, a memory 230, a sensor module 240, an input device 250, a display module 260, an interface 270, an audio module 280, a camera module 291, a power management module 295, a battery 296, an indicator 297, and a motor 298. The processor 210 is capable of driving, for example, an OS or an application program to control a plurality of hardware or software components connected to the processor 210, processing various data, and performing operations. The processor 210 may be implemented as, for example, a system on chip (SoC). The processor 210 may further include a graphic processing unit (GPU) and/or an image signal processor. The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 shown in FIG. 1. For example, the communication interface 170 is capable of including the cellular module 221, a Wi-Fi module 223, a BT module 225, a GNSS module 227 (e.g., a GPS module, Glonass module, Beidou module or Galileo module), an NFC module 228, and a radio frequency (RF) module 229. The cellular module 221 is capable of providing a voice call, a video call, a short message service (SMS) service, an Internet service, etc., through a communication network, for example. The cellular module 221 is capable of identifying and authenticating an electronic device 201 in a communication network by using the SIM 224. The cellular module 221 is capable of performing at least a part of the functions provided by the processor 210. The cellular module 221 may include a CP. Each of the Wi-Fi module 223, the BT module 225, the GNSS module 227, and the NFC module 228 may include a processor for processing data transmitted or received through the corresponding module. At least part of the cellular module 221, Wi-Fi module 223, BT module 225, GNSS module 227, and NFC module 228 (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 226, NFC module 227, and MST module is capable of transmission/reception of RF signals through a separate RF module. The SIM module 224 is capable of including a card including a subscriber identification module (SIM) and/or an embodied SIM. The SIM module 224 is also capable of containing unique identification information, e.g., integrated circuit card identifier (IC-CID), or subscriber information, e.g., international mobile subscriber identity (IMSI).

The memory 230 (e.g., memory 130 shown in FIG. 1) is capable of including a built-in memory 232 or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc. The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

The sensor module 240 is capable of measuring/detecting a physical quantity or an operation state of the electronic device 201, and converting the measured or detected information into an electronic signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and an ultraviolet (UV) sensor 240M. Additionally or alternatively, the sensor module 240 may also include an e-nose sensor, an electromyography (EMG) sensor, an electroencephalogram (EEG) sensor, an electrocardiogram (ECG) sensor, an infrared (IR) sensor, an iris sensor and/or a fingerprint recognition sensor. The sensor module 240 may further include a control circuit for controlling one or more sensors included therein. The electronic device 201 may include a processor, configured as part of the processor 210 or a separate component, for controlling the sensor module 240. In this case, while the processor 210 is operating in sleep mode, the processor is capable of controlling the sensor module 240.

The input device 250 may include a touch panel 252, a (digital) pen sensor 254, a key 256, or an ultrasonic input device 258. The touch panel 252 may be implemented with at least one of a capacitive touch system, a resistive touch system, an IR touch system, and an ultrasonic touch system. The touch panel 252 may further include a control circuit, and the touch panel 252 may include a tactile layer to provide a tactile response to the user. The (digital) pen sensor 254 may be implemented with a part of the touch panel or with a separate recognition sheet. The key 256 may include a physical button, an optical key, or a keypad. The ultrasonic input device 258 is capable of detecting ultrasonic waves, created in an input tool, through a microphone 288, and identifying data corresponding to the detected ultrasonic waves.

The display 260 (for example, the display 160) may include a panel 262, a hologram device 264, a projector 266, and/or a control circuit for controlling these elements. The panel 262 may be implemented to be, for example, flexible, transparent, or wearable. The panel 262 and the touch panel 252 may be configured as at least one module. According to an embodiment, the panel 262 may include a pressure sensor (or a POS sensor) which may measure the strength of pressure of a user's touch. The pressure sensor may be implemented integrally with the touch panel 252 or may be implemented as at least one sensor separate from the touch panel 252. The hologram device 264 may show a three-dimensional image in the air by using an interference of light. The projector 266 may display an image by projecting light onto a screen. The screen may be located, for example, in the interior of, or on the exterior of, the electronic device 201. The interface 270 may include an HDMI 272, a USB 274, an optical interface 276, or a d-subminiature (D-sub) 278. The interface 270 may be included in the communication interface 170 shown in FIG. 1. Additionally or alternatively, the interface 270 may include a mobile high-definition link (MHL) interface, an SD card/MMC interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, a microphone 288, etc. The camera module 291 is a device capable of taking both still and moving images. The camera module 291 may include one or more image sensors (e.g., a front image sensor or a rear image sensor), a lens, an image signal processor (ISP), a flash (e.g., an LED or xenon lamp), etc. The power management module 295 is capable of managing power of the electronic device 201. The power management module 295 may include a power management integrated circuit (PMIC), a charger IC, or a battery gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296. The battery 296 may be implemented by, for example, a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc. Each of the elements described in this document may be formed with one or more components, and the names of the corresponding elements may vary according to the type of the electronic device. In various embodiments, the electronic device (e.g., the electronic device 201) may include at least one of the above described elements, and may exclude some of the elements or further include other additional elements. Further, some of the elements of the electronic device according to various embodiments may be coupled to form a single entity while performing the same functions as those of the corresponding elements before the coupling.

Figure 3:
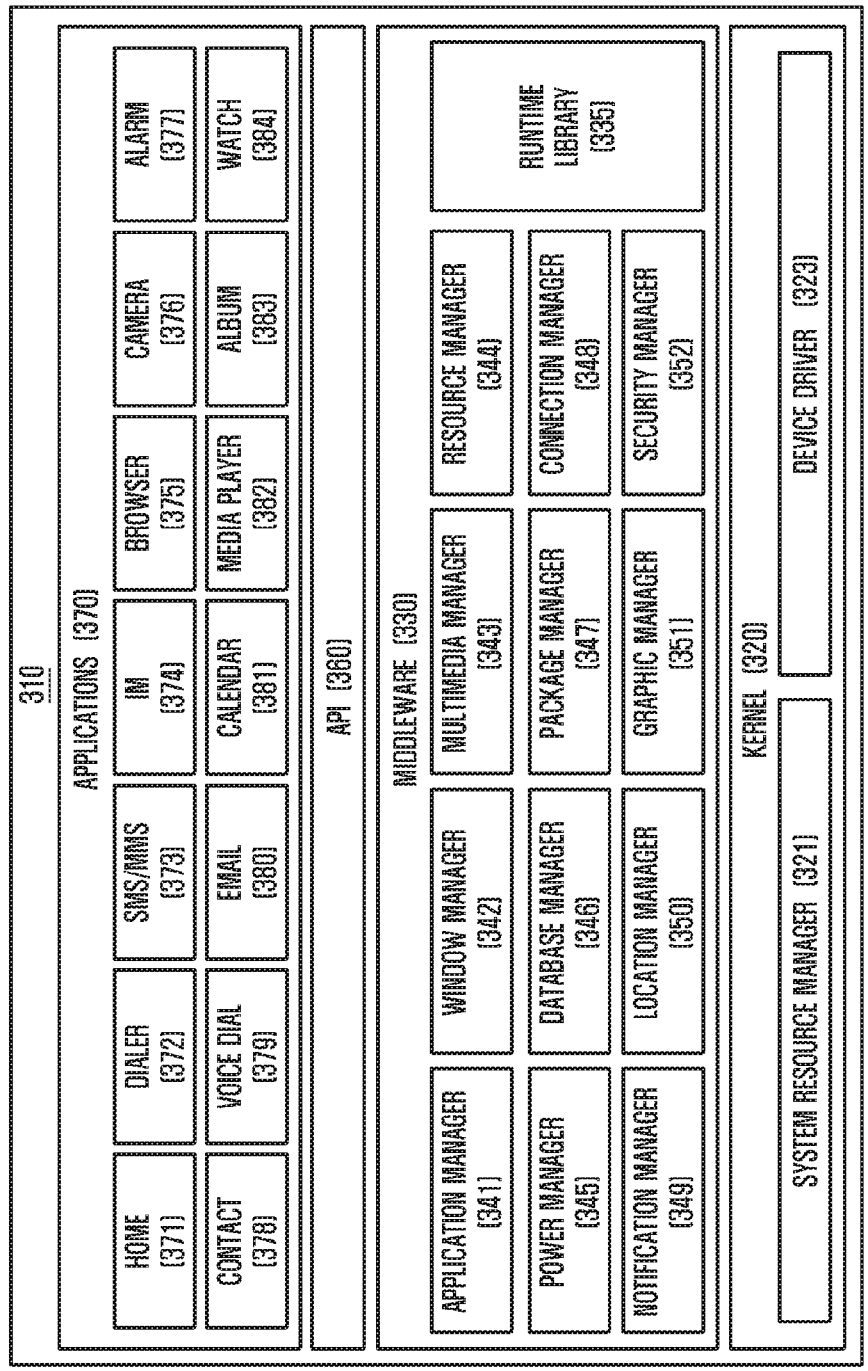
FIG. 3 is a block diagram of a program module according to various embodiments.

FIG. 3 is a block diagram of a programming module according to an embodiment of the present disclosure. According to an embodiment, the program module 310 (e.g., programs 141-147 shown in FIG. 1) is capable of including an operation system (OS) for controlling resources related to the electronic device (e.g., electronic device 11) and/or various applications (e.g., application programs 147 shown in FIG. 1) running on the OS. The OS may be Android™, iOS™, Windows™, Symbian™, Tizen™, Bada™, etc. Referring to FIG. 3, The program module 310 is capable of including a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 14A) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 312 may include an Inter-Process Communication (IPC) driver. The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 14B) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like. The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370. The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 11) has a call function, the middleware 330 may further include a telephony manager for managing a voice of the electronic device or a video call function. The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components. The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 14D) may include one or more applications for performing various functions, e.g., home 371, diary 372, SMS/MMS 373, instant message (IM) 374, browser 375, camera 376, alarm 377, context 378, voice dial 379, email 380, calendar 381, media player 382, album 383, clock 384, health care (e.g., an application for measuring amount of exercise, blood sugar level, etc.), and environment information (e.g., an application for providing atmospheric pressure, humidity, temperature, etc.). According to an embodiment, the applications 370 are capable of including an application for supporting information exchange between an electronic device (e.g., electronic device 31) and an external device (e.g., electronic devices 32 and 34), which is hereafter called 'information exchange application'). The information exchange application is capable of including a notification relay application for relaying specific information to external devices or a device management application for managing external devices. For example, the notification relay application is capable of including a function for relaying notification information, created in other applications of the electronic device to external devices. In addition, the notification relay application is capable of receiving notification information from external devices to provide the received information to the user. The device management application is capable of managing (e.g., installing, removing or updating) at least one function of an external device communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc. According to an embodiment, the applications 370 are capable of including an application (e.g., a health care application of a mobile medical device, etc.) specified attributes of an external device. According to an embodiment, the applications 370 are capable of including applications received from an external device. At least part of the program module 310 can be implemented with software, firmware, hardware, or any combination of two or more of them. At least part of the program module 310 can be implemented (e.g., executed) by a processor (e.g., processor 210). At least part of the programing module 310 may include modules, programs, routines, sets of instructions or processes, etc., in order to perform one or more functions.

The term 'module' as used in various embodiments of the present disclosure may mean a unit including one of hardware, software, and firmware or any combination of two or more of them. The 'module' may be interchangeable with the term 'unit,' 'logic,' 'logical block,' 'component,' or 'circuit.' The 'module' may be the smallest unit of an integrated component or a part thereof. The 'module' may be the smallest unit that performs one or more functions or a part thereof. The 'module' may be mechanically or electronically implemented. For example, the 'module' according to various embodiments of the present invention may include at least one of the following: application-specific integrated circuit (ASIC) chips, field-programmable gate arrays (FPGAs), and programmable-logic devices for performing certain operations, which are now known or will be developed in the future. At least part of the method (e.g., operations) or system (e.g., modules or functions) according to various embodiments can be implemented with instructions as programming modules that are stored in computer-readable storage media. One or more processors (e.g., processor 120) can execute instructions, thereby performing the functions. An example of the computer-readable storage media may be a memory 130. At least part of the programming modules can be implemented (executed) by a processor. Examples of computer-readable media include: magnetic media, such as hard disks, floppy disks, and magnetic tape; optical media such as Compact Disc Read Only Memory (CD-ROM) disks and Digital Versatile Disc (DVD); magneto-optical media, such as floptical disks; and hardware devices that are specially configured to store and perform program instructions (e.g., programming modules), such as read-only memory (ROM), random access memory (RAM), flash memory, etc. Examples of program instructions include machine code instructions created by assembly languages, such as a compiler, and code instructions created by a high-level programming language executable in computers using an interpreter, etc. Modules or programming modules according to various embodiments may include one or more components, remove part of them described above, or include new components. The operations performed by modules, programming modules, or the other components, according to various embodiments, may be executed in serial, parallel, repetitive or heuristic fashion. Part of the operations can be executed in any other order, skipped, or executed with additional operations.

Figure 4:
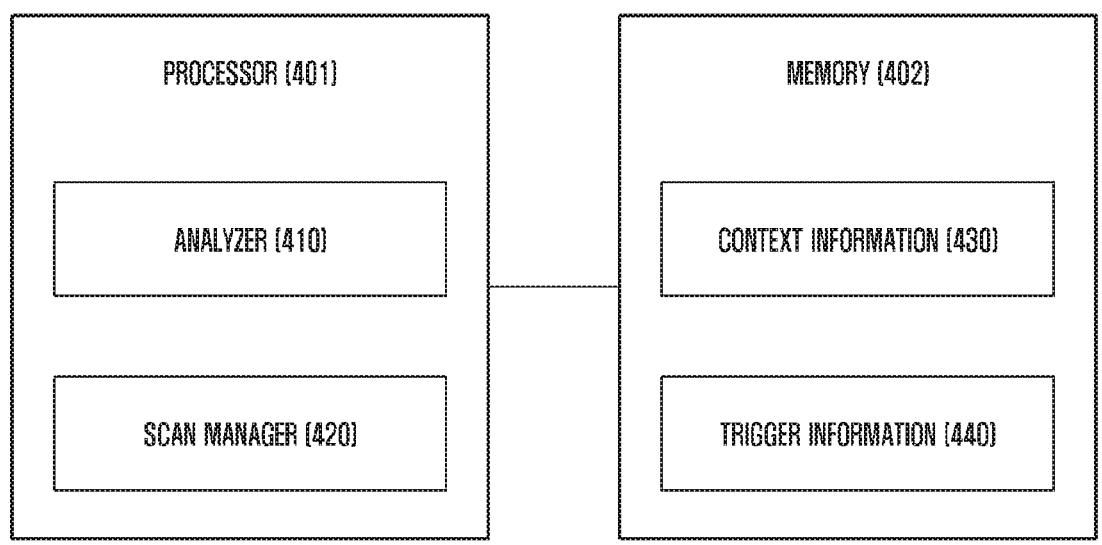
FIG. 4 illustrates an additional configuration of the memory of FIG. 2.

FIG. 4 illustrates the configuration of a processor and that of a memory according to various embodiments.

The processor 401 may be the processor 210 of FIG. 2, may access the memory 402, may process instructions, and may perform a function according to the result of processing. For example, the processor 401 may process instructions stored in the memory 402 and may operate as a context analyzer (hereinafter, referred to as an analyzer) 410 and/or as a scan manager (hereinafter, referred to as a manager) 420.

The memory 402 according to various embodiments may be the memory 230 of FIG. 2 and may store various instructions for operating the electronic device (for example, the electronic device 201 of FIG. 2) through interworking with the processor 401 and various pieces of data which are generated on the basis of the operation, or which are received from the outside through the communication module (for example, the communication module 220 of FIG. 2). For example, the memory 402 may store instructions set such that the processor 401 operates as the analyzer 410 and/or the manager 420. As another example, the memory 230 may store at least a part of context information 430 and/or trigger information 440 as data.

The analyzer 410 according to various embodiments may determine the scan cycle (for example, frequency) of wireless communication at least partially on the basis of information related to the condition of the electronic device. For example, the analyzer 410 may recognize the operating mode (in other words, operating condition) of the electronic device and/or the triggering event (in other words, reason) that has triggered the start of such an operating mode, and may determine the scan frequency on the basis of the triggering event. For example, the recognized triggering event may refer to the trigger information 440 and may be stored by the processor in the memory together with information regarding the corresponding operating mode (for example, identification information that indicates the corresponding operating mode, or the timepoint at which the electronic device has started operating in the corresponding operating mode). For example, a triggering event that has triggered turning-on of the display may be two consecutive pressings of a specific key (for example, the home key) among multiple physical keys configured on the electronic device.

For example, the operating mode may largely be divided into an active mode and a sleep mode (in other words, inactive mode). For example, the active mode may be defined as a condition in which at least one process (for example, display of a lock screen or an application screen, music playback, and the like) is being executed. For example, a process for scan frequency determination and/or scan control may be executed together when at least one different process is being executed.

As another example, the active mode may be divided into a first active mode (screen-off mode) and a second active mode (screen-on mode) according to whether the display (for example, the display 260 of FIG. 2) is driven or not. For example, the sleep mode may be defined as a condition in which no process is being executed. If the operating mode is changed from the active mode to the sleep mode by a specific triggering event (for example, because execution of a process is ended as a result of switching from screen-on to screen-off, or because execution of a process is ended following an elapse of a predetermined time after switching to screen-off), the process for scan frequency determination and/or scan control may also be ended. For example, execution of the process for scan frequency determination and/or scan control may be triggered by a change of the operating mode from the sleep mode to the active mode. If the operating mode changes to the contrary (from the active mode to the sleep mode), execution of the process may end, and the scan operation of the WiFi module (for example, the WiFi module 223 of FIG. 2) following such a process may also end. Meanwhile, the electronic device may be equipped with a function that is set such that, even if the display (for example, the display 260 of FIG. 2) switches from screen-on to screen-off, specific information is always displayed (also referred to as always on display (AOD)). For example, when the AOD is activated, the corresponding information (for example, the current time) may be displayed on the display even if the electronic device switches to the screen-off mode or switches from the screen-off mode to the sleep mode.

According to some embodiments, the process for scan frequency determination and scan control may be executed continuously regardless of the operating mode (in other words, regardless of whether a different process is executed or not). It is also possible to determine whether or not to execute the process for scan frequency determination and scan control according to the type of the process that is being executed. For example, the process for scan frequency determination and/or scan control may not be executed if the position of the electronic device analyzed by using measured or sensed information is not a specific known place (for example, home, company, or the like), although the operating mode is active. The process for scan frequency determination and/or scan control may not be executed if the current time corresponds to a sleeping time, although the operating mode is active.

The above-mentioned triggering event may be defined as the reason that has triggered a change from the sleep mode to the active mode or from the screen-off mode to the screen-on mode. For example, the triggering event that triggers a mode change may include: pressing a key (for example, the key 256 of FIG. 2) by the user; a touch gesture (for example, a double touch) with regard to the touch panel (for example, the touch panel 252) by the user; receiving a message or a call through the communication module (for example, the cellular module 221); a notification from an application; opening the cover for protecting the display (for example, the display 260); and separating the electronic pen from the electronic device 201. In this regard, the cover may include a magnet, for example, and the process or 210 may recognize whether the cover is opened or not by using a magnetic sensor 240D.

According to various embodiments, the manager 420 may control the scan operation of the WiFi module 223 on the basis of the determined scan frequency.

According to an embodiment, if a change in the operating mode results in a screen-on condition, the analyzer 410 may recognize what is triggering event that has triggered screen-on. For example, the analyzer 410 may determine the possibility that the user will use the electronic device (for example, the electronic device 201) on the basis of the recognized triggering event. For example, the scan frequency may be differentiated according to the degree of the determined possibility of usage. Such differentiation may be performed by the analyzer 410 or the manager 420. For example, if the screen-on has resulted from the user's behavior (in other words, user input) (for example, pressing a key, a touch gesture, opening the cover, or separating the electronic pen), there is a high possibility of usage, and the analyzer 410 may accordingly adjust the scan frequency to a "fast scan frequency". If the screen-on has resulted not from the user's behavior, but from a specific process that is being executed by the electronic device 201 (for example, receiving a message or a call through the cellular module 221 or a notification from an application (for example, a health application notifying that the number of steps has exceeded a predetermined threshold)), there is a relatively low possibility of usage, and the analyzer 410 may accordingly maintain the scan frequency at a "slow scan frequency".

According to an embodiment, the analyzer 410 may maintain the scan frequency at the "slow scan frequency" instead of the "fast scan frequency" if the operating mode switches from the screen-off mode to the screen-on mode because the screen-on has resulted from a specific behavior of the user, but if it is confirmed that the behavior is for a specific purpose, having nothing to do with wireless connection. For example, assuming that pressing a specific key (for example, the home key) among multiple physical keys configured on the electronic device 201 two consecutive times has been set as an input that triggers driving of the camera module 291, an image taken by the camera module 291 may be displayed on the display 260 if such an input occurs. For example, if the user's behavior is for the purpose of taking images, the analyzer 410 may maintain the scan frequency at the "slow scan frequency".

According to an embodiment, the analyzer 410 may adjust the scan frequency to the fast scan frequency if the user's behavior is for the purpose of taking images, and if the electronic device has previously been set to upload taken images to an external device (for example, the server 106).

According to an embodiment, the analyzer 410 may determine, as the scan frequency, a "fast scan frequency" or a "medium scan frequency" that corresponds to the medium rank, even if the screen-on triggering event is other than the user's behavior. For example, a message or a call may be received from a contact known to the electronic device 201. For example, the contact information (for example, the telephone number) of the message or call may be information included in the contact list stored in the memory 230. In this case, the analyzer 410 may adjust the scan frequency to the "fast scan frequency" or to the "medium scan frequency". As another example, if a notification from an application is an alarm for a specific notification (for example, a specific schedule (for example, time to get up, meeting, or the like), the scan frequency may be adjusted to the "fast scan frequency" or to the "medium scan frequency".

According to an embodiment, the analyzer 410 may determine the scan frequency additionally on the basis of context information 430. In this regard, the context information 430 may include setting information that indicates whether or not to display the lock screen when the display 260 switches from the off-condition to the on-condition. For example, the lock screen may be displayed on the display 260 as a result of a first behavior of the user while the electronic device 201 is set to be locked. While the lock screen is being displayed, the analyzer 410 may recognize the second behavior of the user and may identify the purpose or the second behavior or the result thereof. For example, if the purpose is to trigger driving of the camera module 291, the analyzer 410 may maintain the scan frequency at the "slow scan frequency". If the purpose of the second behavior is unlocking, and if the "home screen" is displayed as a result thereof, the analyzer 410 may adjust the scan frequency to the "fast scan frequency". As another example, if the electronic device 201 is not set to be locked, the analyzer 410 may adjust the scan frequency to the "fast scan frequency" on the basis of the user's behavior.

According to an embodiment, if the first behavior is a specific behavior (for example, the home button, the power key, opening the cover, or separating the electronic pen), the scan frequency may be adjusted to the "fast scan frequency" on the basis of the specific behavior, although the lock screen is being displayed.

According to an embodiment, the analyzer 410 may determine the scan frequency additionally on the basis of a wireless connection history. For example, if a connection between the AP and the electronic device 201 is established, the processor 210 may collect information indicating what triggering event (for example, one of the above-mentioned triggering events) has resulted in the connection with the AP, as well as when and where (for example, the position of the electronic device 201 acquired by using the GNSS module 227, or the identification information (for example, IP address) of the connected AP), and the processor 210 may store the collected information in the memory 230 as one piece of context information 430. Using the wireless connection history, the analyzer 410 may differentiate the possibility of usage of the electronic device 201 with regard to each triggering event, with regard to each time period, or with regard to each position, and may use the result of differentiation with the highest priority when determining the scan frequency. For example, if the current time belongs to the time period during which the largest number of wireless connections have been made (for example, between one to two o'clock PM), and if the operating mode switches from the screen-off mode to the screen-on mode, the analyzer 410 may determine, as the scan frequency, a "fast scan frequency" without considering other conditions (for example, triggering events, whether lock has been set or not, and the like). Such a consideration with the highest priority may be the position or the triggering event, besides the time. In addition, the consideration with the highest priority may be a combination of at least two selected from the time, the position, and the triggering event. For example, if the current time and position correspond to the time period and location at which most wireless connections have been made, and if the operating mode switches from the screen-off mode to the screen-on mode, the analyzer 410 may determine the scan frequency to be the "fast scan frequency".

According to an embodiment, the analyzer 410 may use information acquired through the power manager (for example, the power manager 345) of the electronic device in order to recognize the triggering event that has triggered turning-on of the display. For example, the power manager 345 may control the processor 210 so as to supply power from the battery 296 to the display 260 in order to turn the display on, and may control the processor 210 so as to record information regarding the reason the display is turned on (for example, wake-up event) in the memory (for example, the memory 230). For example, the recorded information may be a user behavior such as pressing a key, a touch gesture, opening the cover, separating the electronic pen, or the like. In addition, the recorded information may be a received message or call, a notification from an application, or the like. The analyzer 410 may recognize the recorded information as the above-mentioned reason.

According to an embodiment, the scan frequency may be determined to be a fast scan frequency, a medium scan frequency, or a slow scan frequency, and the determination may be based on the triggering event that has triggered turning-on of the display and whether locking has been set or not, as summarized in Table 1 below.

TABLE 1

| Lock setting | Triggering event | Scan frequency |
| --- | --- | --- |
| O | user behavior intended for camera execution (for example, pressing the home key twice), a received message or call, a notification from an application | slow scan frequency |
| | a message or call received from a known contact, or a notification from an application regarding a schedule | medium scan frequency or fast scan frequency |
| | user behavior other than one for camera execution (for example, pressing the home key or power key, separating the cover) | fast scan frequency |
| X | triggering event other than a user behavior | slow scan frequency |
| | user behavior | fast scan frequency |

According to various embodiments of the present disclosure, an electronic device may include: a display; a short-range wireless communication circuit configured to repeatedly transmit a scan signal for finding an access point; a processor electrically connected to the communication circuit; and a memory electrically connected to the processor. The memory may store instructions that, when executed, cause the processor to set a transmission cycle of the scan signal to be a first cycle, to determine, if the display is turned on, whether a scan frequency needs to be adjusted or not on the basis of a triggering event that has triggered turning on of the display, to maintain the transmission cycle at the first cycle if the scan frequency does not need to be adjusted, and to change the transmission cycle to a second cycle that is shorter than the first cycle if the scan frequency needs to be adjusted.

The memory may further store an instruction configured such that, after the transmission cycle is changed to the second cycle, the transmission cycle gradually becomes longer than the second cycle.

If the triggering event is a user behavior, it may be determined that the scan frequency needs to be adjusted. If the triggering event is a notification from an application or a message or a call received from an external device, it may be determined that the scan frequency does not need to be adjusted.

The behavior may be pressing a key configured on the electronic device, a touch gesture regarding the display, opening a cover for protecting the display, or separating an electronic pen from the electronic device.

When the electronic device further includes a camera module, if the triggering event is a user input for displaying an image taken by the camera module, it may be determined that the scan frequency does not need to be adjusted, and, if the triggering event is a user input for displaying a lock screen, it may be determined that the scan frequency needs to be adjusted.

When the electronic device further includes a camera module, if the triggering event is a first user input for displaying a lock screen, it may be determined that the scan frequency does not need to be adjusted, and the memory may further store an instruction that configured such that, if a second user input recognized while the lock screen is displayed on the display is for switching from the lock screen to a different screen, it is determined that the scan frequency needs to be adjusted, and an instruction configured such that, if the second user input is for displaying an image taken by the camera module, it is determined that the scan frequency does not need to be adjusted.

The memory may further store an instruction configured such that, if the display is turned off, or if a predetermined time elapses after the transmission cycle of the scan signal changes from the first cycle to the second cycle, the transmission cycle of the scan signal is adjusted to the first cycle.

When the electronic device further includes a cellular module, if the triggering event is a message or a call received through the cellular module from a contact known to the electronic device, it may be determined that the scan frequency needs to be adjusted.

If the triggering event is a notification from an application that is stored in the memory and can be executed by the processor, and if the notification is related to a schedule, it may be determined that the scan frequency needs to be adjusted.

According to various embodiments of the present disclosure, an electronic device may include: a display; a short-range wireless communication circuit configured to repeatedly transmit a scan signal for finding an access point; a processor electrically connected to the communication circuit; and a memory electrically connected to the processor. The memory may store instructions that, when executed, cause the processor to differentiate a transmission cycle of the scan signal according to whether a screen to be displayed when the display is turned on is a lock screen or not, if the display is turned on while no wireless connection is established with the access point.

If the screen to be displayed when the display is turned on is the lock screen, the transmission cycle may be set to be a first cycle, and, if the screen to be displayed when the display is turned on is a different screen other than the lock screen, the transmission cycle may be set to be a second cycle that is shorter than the first cycle. The different screen may be a home screen including an icon corresponding to an application, or a screen finally displayed on the display right before the display is turned on.

When the electronic device further includes a camera module, the memory may further store an instruction configured such that, if the screen to be displayed when the display is turned on includes an image taken by the camera module, the transmission cycle of the scan signal is set to be the first cycle.

The memory may further store an instruction configured such that, if the screen of the display changes from the lock screen to a different screen, the transmission cycle is changed from the first cycle to the second cycle.

The memory may further store an instruction configured such that, after the transmission cycle is changed to the second cycle, the transmission cycle gradually becomes longer than the second cycle.

Figure 5:
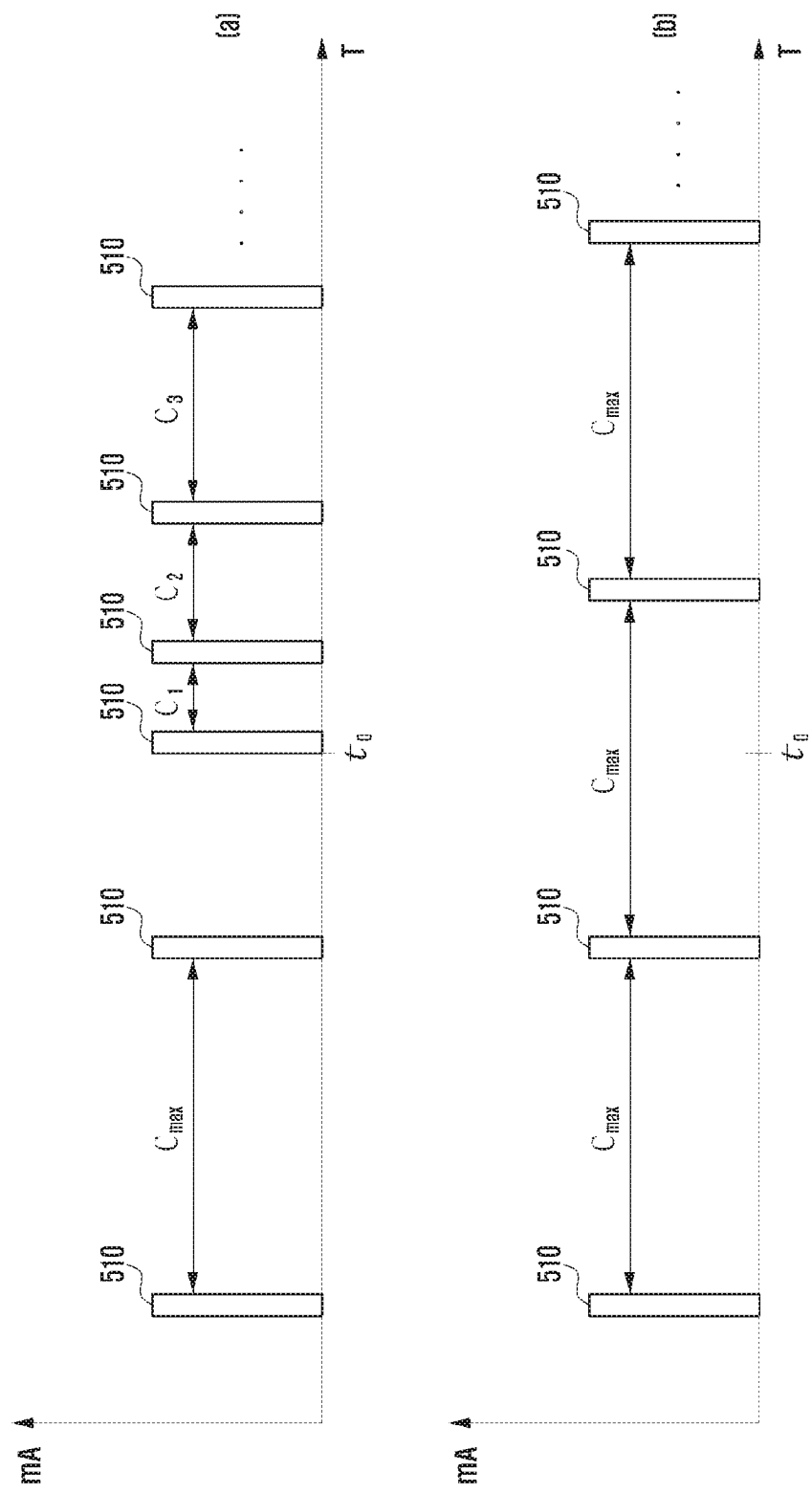
FIG. 5A and FIG. 5B illustrate a scan operation before and after a display is turned on, according to various embodiments of the present disclosure.

FIG. 5A and FIG. 5B illustrate a scan operation before and after the display is turned on, according to various embodiments of the present disclosure.

Referring to FIG. 5A and FIG. 5B, the WiFi module (for example, the WiFi module 223 of FIG. 2) may transmit a scan signal 510 at a cycle of C(cycle)_max. For example, when the screen of the electronic device is turned off, the WiFi module may transmit a scan signal at a cycle of C_max. For example, at the timepoint "t0", the operating mode may switch from the screen-off mode to the screen-on mode. As another example, if the operating mode switches to the screen-on mode, and if a lock setting has been made, the lock screen may be displayed on the display (for example, the display 260 of FIG. 2). If the lock setting has not been made, the home screen or the screen that has been displayed right before the display was turned off (for example, an application screen) may be displayed on the display. As another example, if the triggering event that has triggered the start of the screen-on mode is a specific behavior of the user for executing a specific application (for example, the camera 376 of FIG. 3), an image taken by the camera module (for example, the camera module 291 of FIG. 2) may be displayed on the display.

According to various embodiments, if mode switching occurs at the timepoint "t0", the processor 210 may determine whether or not to adjust the scan frequency. If it is determined that the scan frequency needs to be adjusted, the processor (for example, the processor 210 of FIG. 2) may control the WiFi module so as to transmit a scan signal 510 repeatedly at a cycle shorter than C_max, as illustrated in FIG. 5A. According to an embodiment, the cycle C2 may be longer than C1, C3 may be longer than C2, and the cycle may then become longer gradually and may finally converge to C_max. For example, there may occur a situation in which, although the scan frequency has been increased since use of the electronic device (for example, the electronic device 201 of FIG. 2) was expected, no connection with the AP is established contrary to the expectation, and this may waste the power in the battery (for example, the battery 296 of FIG. 2). Therefore, the processor may perform an operation such that the cycle converges to C_max, in order to minimize battery power consumption.

As another example, according to operation of the processor, the possibility of usage of the electronic device may be differentiated, and the possibility of usage may be, for example, differentiated into two ranks (a slow scan mode and a fast scan mode) or three ranks (a slow scan mode, a medium scan mode, and a fast scan mode), as exemplified above. Therefore, the cycles C1, C2, and C2 may be slightly shorter in the case of the fast scan mode than in the case of the medium scan mode. For example, if C_max is 128 seconds, and in the case of the fast scan mode, the cycles C1, C2, and C3 may be 8 seconds, 16 seconds, and 32 seconds, respectively. In the case of the medium scan mode, the cycles C1, C2, and C3 may be 16 seconds, 32 seconds, and 64 seconds, respectively. For example, if a connection with the AP is established, the processor 210 may end the scan operation. If the display 260 is turned off before a connection with the AP is established, the scan frequency may switch to the slow scan frequency. For example, if it has been determined that there is no need to adjust the scan frequency, the processor may maintain the transmission cycle of the scan cycle 510 at C_max even if the display is tuned on, thereby minimizing battery power consumption.

Figure 6:
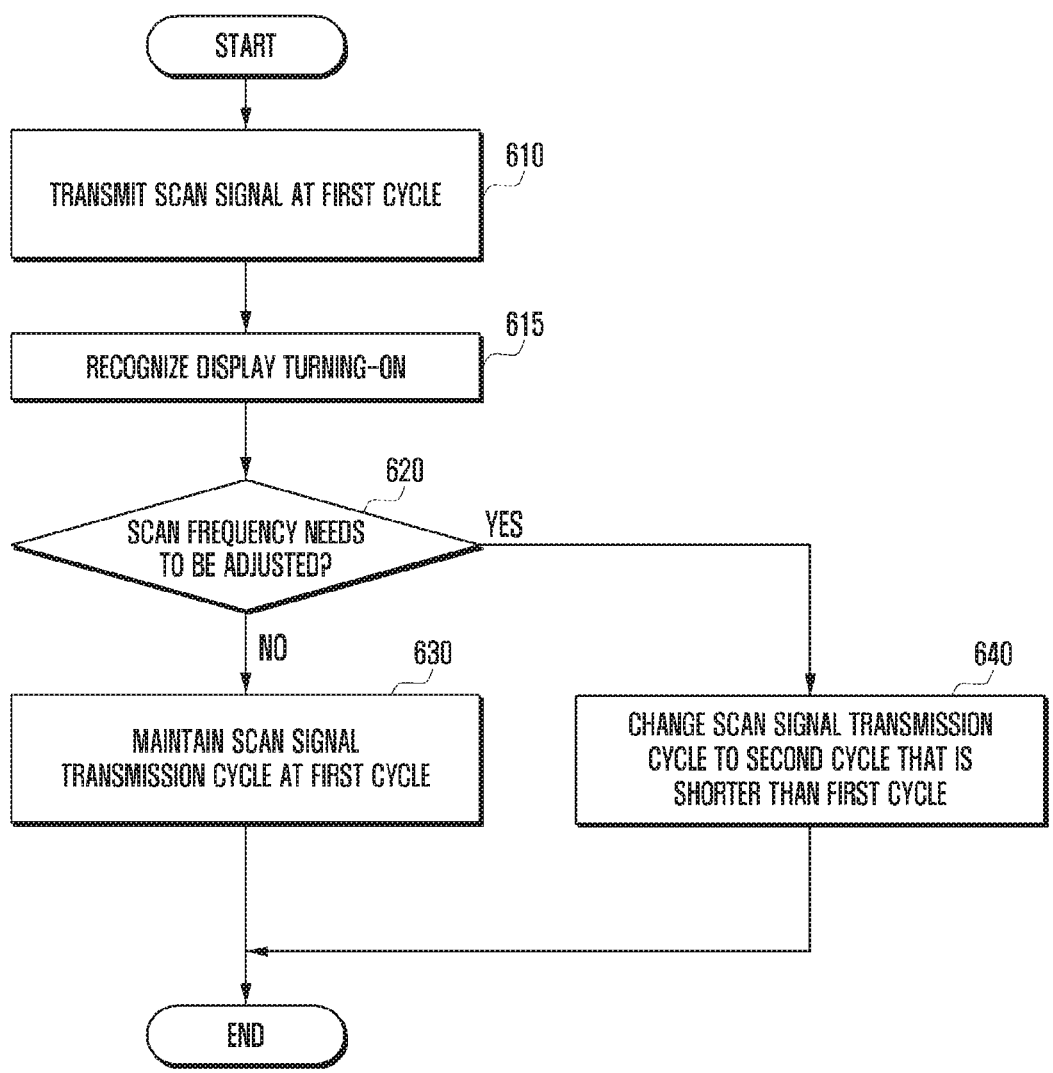
FIG. 6 is a flowchart of a method for operating an electronic device according to various embodiments of the present disclosure.

FIG. 6 is a flowchart of a method for operating an electronic device according to various embodiments of the present disclosure.

In operation 610 according to various embodiments, the electronic device may transmit a scan signal at a first cycle. For example, the electronic device 201 may be in a condition in which the display (for example, the display 260 of FIG. 2) (for example, the panel 262) is turned off, but the same is operating in the active mode, and in which the WiFi module (for example, the WiFi module 223 of FIG. 2) is activated, but there is no wireless connection established with the AP. In such a situation, the processor (for example, the processor 210 of FIG. 2) may control the WiFi module so as to transmit a scan signal at a first cycle.

In operation 615 according to various embodiments, the processor may recognize turning-on of the display. For example, the processor of the electronic device may recognize that the display is turned on while a scan signal is being transmitted at the first cycle.

If the display is turned on, in operation 620 according to various embodiments, the electronic device may determine whether the scan frequency needs to be adjusted or not. For example, if the display of the electronic device is turned on, the processor may determine the possibility of usage by the user and may determine whether the scan frequency needs to be adjusted or not at least partially on the basis of the determination result. For example, the possibility of usage is high if the screen-on has resulted from the user's behavior (for example, pressing a key, a touch gesture, opening the cover, or separating the electronic pen), and the processor 210 may then determine that the scan frequency needs to be adjusted. As another example, the processor may also determine whether the scan frequency needs to be adjusted or not additionally on the basis of whether the electronic device has been set to be locked or not. For example, if the electronic device has been set to be locked, the processor may determine that the scan frequency needs to be adjusted if the screen-on results from a received message or call, and if the same is from a known contact. In addition, it may be determined that the scan frequency needs to be adjusted if the screen-on results form a notification from an application, and if the same is for notifying a schedule (for example, time to get up, meeting, or the like). Moreover, it may be determined that the scan frequency needs to be adjusted if the user's behavior that has resulted in screen-on is for the purpose of unlocking.

If it is determined in operation 620 that the scan frequency does not need to be adjusted, the processor may maintain the scan signal transmission interval at the first cycle in operation 630 according to various embodiments.

If it is determined in operation 620 that the scan frequency needs to be adjusted, the processor may change the scan signal transmission cycle to a second cycle, which is shorter than the first cycle, in operation 640 according to various embodiments. Additionally, the processor may change the scan signal transmission cycle such that the same becomes gradually longer than the second cycle in operation 640. For example, the second cycle may be 8 seconds, the next cycle may be 16 seconds, and the next cycle may increase to 32 seconds and finally converge to C-max (for example, 128 seconds).

Figure 7:
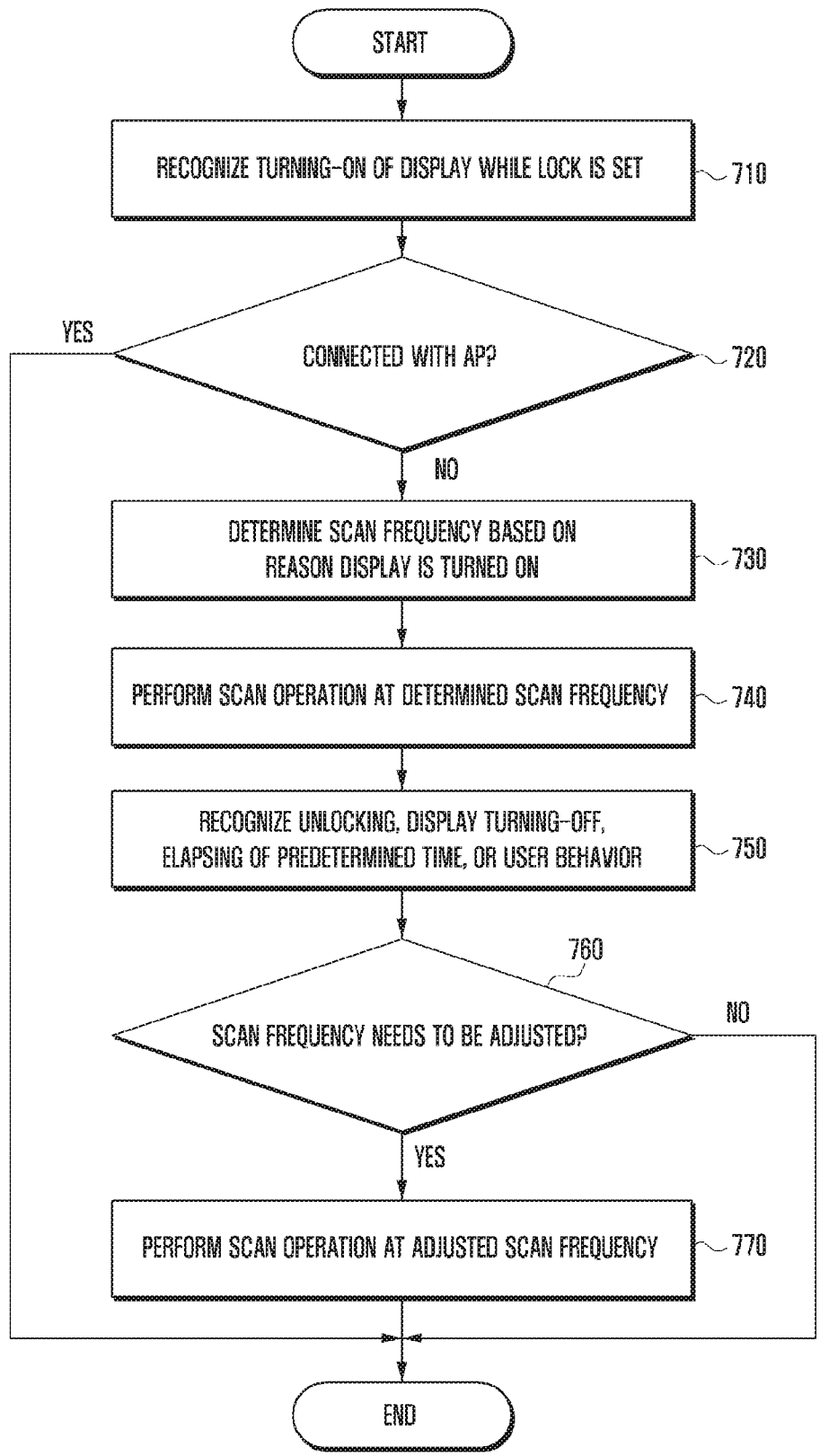
FIG. 7 is a flowchart of a method for operating an electronic device according to various embodiments of the present disclosure.

FIG. 7 is a flowchart of a method for operating an electronic device according to various embodiments of the present disclosure.

In operation 710 according to various embodiments, the processor (for example, the processor 210 of FIG. 2) may recognize turning-on of the display (for example, the display 260 of FIG. 2) in a lock setting condition. Additionally, the processor may store at least a part of information regarding turning-on of the display in the memory (for example, the memory 230 of FIG. 2). For example, the processor may store the same in the memory as trigger information regarding the reason the display is turned on (for example, the trigger information 440 of FIG. 4). When the display is turned on, the processor may confirm whether a connection with the access point (AP) is established or not in operation 720 according to various embodiments. For example, if a connection with the AP is established, the memory may have identification information of the corresponding AP or information indicating connection establishment stored therein, and the processor may recognize the connection establishment by checking the information.

If no connection with the AP is established, the processor may determine the scan frequency at least partially on the basis of the above reason (that is, trigger information) in operation 730 according to various embodiments. For example, if the reason is a user behavior for the purpose of camera execution (for example, in the case of "pressing the home key twice"), if the same is a received message or call, or if the same is a notification from an application, the scan frequency may be determined to be the slow scan frequency. As another example, if the above reason is a received message or call, and if the same is from a contact known to the electronic device (for example, if the contact (for example, telephone number) is information included in the contact list stored in the memory), the scan frequency may be determined to be the medium scan frequency or the fast scan frequency. As another example, if a user behavior (for example, pressing the home key or the power key, separating the cover, or the like) other than user behaviors with the above-mentioned purposes has occurred, the scan frequency may be determined to be the fast scan frequency.

The processor may perform a scan operation at the determined scan frequency in operation 740 according to various embodiments.

The processor may recognize unlocking, display turning-off, elapsing of a predetermined time after performing a scan operation at the determined scan frequency, or a user behavior for unlocking in operation 750 according to various embodiments.

The processor may determine whether the scan frequency needs to be adjusted or not in operation 760 according to various embodiments. For example, if unlocking has occurred, the processor may determine whether the scan frequency needs to be increased or not. As another example, if the display has been turned off, or if a predetermined time has elapsed, the processor may determine whether the scan frequency needs to be decreased or not.

If it is determined in operation 760 according to various embodiments that adjustment is needed, the processor may perform a scan operation at the adjusted scan frequency in operation 770. For example, if unlocking has occurs, or if a user behavior to this end (for example, entering a password of fingerprint) occurs while the scan operation proceeds at the slow scan frequency or at the medium scan frequency, the scan frequency may be adjusted to the fast scan frequency. If a predetermined time elapses, or if the display is turned off while the scan operation proceeds at the medium scan frequency or at the slow scan frequency, the scan frequency may be adjusted to the slow scan frequency.

Figure 8:
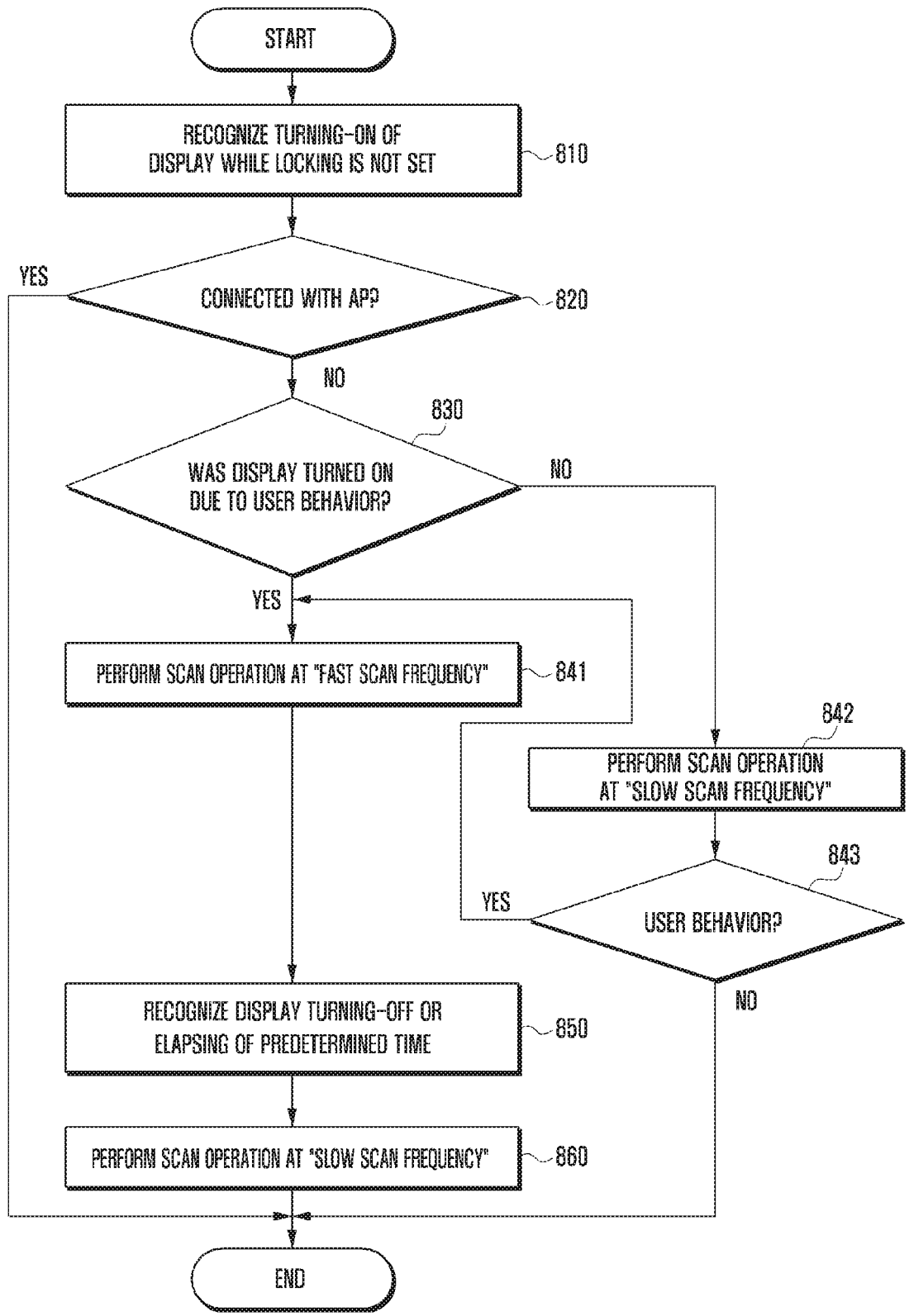
FIG. 8 is a flowchart of a method for operating an electronic device according to various embodiments of the present disclosure.

FIG. 8 is a flowchart of a method for operating an electronic device according to various embodiments of the present disclosure.

In operation 810 according to various embodiments, the processor (the processor 210 of FIG. 2) may recognize turning-on of the display (for example, the display 260 of FIG. 2) while no lock has been set. Additionally, the processor (for example, the processor 210 of FIG. 2) may store the reason thereof in the memory (for example, the memory 230 of FIG. 2) as trigger information (for example, trigger information 440 of FIG. 4).

If the display is turned on, the processor may determine whether a connection with the AP is established or not in operation 820 according to various embodiments.

If no connection with the AP is established, the processor may determine whether the reason the display is turned on is a user behavior or not in operation 830 according to various embodiments.

If it is determined in operation 830 that the reason is a user behavior, the processor may perform a scan operation at a fast scan frequency in operation 841 according to various embodiments.

If it is determined in operation 830 that the reason is other than a user behavior (for example, a received message or call), the processor may perform a scan operation at the slow scan frequency in operation 842 according to various embodiments. During the low scan operation, the processor 210 may confirm whether a user behavior (for example, a screen touch, pressing the home key, or the like) is received through the input device (for example, the input device 250 of FIG. 2) or not in operation 843. If a user behavior is received during the slow scan operation, the processor may perform a scan operation at the fast scan frequency in operation 841.

During the fast scan operation, the processor may recognize display turning-off or elapsing of a predetermined time after performing the scan operation at the fast scan frequency in operation 850 according to various embodiments.

If display turning-off or elapsing of a predetermined time occurs, the processor may perform a scan operation at the slow scan frequency in operation 860.

According to various embodiments of the present disclosure, a method for scanning an access point by an electronic device may include the operations of: periodically transmitting a scan signal for finding an access point at a first cycle; determining, if a display is turned on, whether a scan frequency needs to be adjusted or not on the basis of a triggering event that has triggered turning-on of the display; and maintaining the transmission cycle at the first cycle if the scan frequency does not need to be adjusted and changing the transmission cycle to a second cycle that is shorter than the first cycle if the scan frequency needs to be adjusted.

The scan method may further include an operation of causing the transmission frequency to gradually become longer than the second cycle after the transmission cycle is changed to the second cycle.

The determining operation may include an operation of determining that the scan frequency needs to be adjusted if the triggering event is a user behavior, and determining that the scan frequency does not need to be adjusted if the triggering event is a notification from an application or a message or a call received from an external device.

The determining operation may include an operation of determining that the scan frequency does not need to be adjusted if the triggering event is a user input for displaying an image taken by the camera module, and determining that the scan frequency needs to be adjusted if the triggering event is a user input for displaying a lock screen.

The determining operation may include an operation of determining that the scan frequency does not need to be adjusted in the case of a first user input for displaying the lock screen, and may further include an operation of determining that the scan frequency needs to be adjusted if a second user input recognized while the lock screen is displayed on the display is for switching from the lock screen to a different screen, and determining that the scan frequency does not need to be adjusted if the second user input is for displaying an image taken by the camera module.

The embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to the embodiments disclosed herein, the scope of the various embodiments of the present disclosure should be construed to include all modifications or modified forms drawn based on the technical idea of the various embodiments of the present disclosure.

The invention claimed is:

1. An electronic device comprising:
a display;
a short-range wireless communication circuit configured to repeatedly transmit a scan signal for finding an access point;
a processor electrically connected to the communication circuit; and
a memory electrically connected to the processor, wherein the memory stores instructions that, when executed, cause the processor to:
set a transmission cycle of the scan signal to be a first cycle,
determine, if the display is turned on, whether a scan frequency needs to be adjusted or not based on a type of a triggering event that has triggered turning on of the display,
maintain the transmission cycle at the first cycle, if the scan frequency does not need to be adjusted, and
change the transmission cycle to a second cycle that is shorter than the first cycle, if the scan frequency needs to be adjusted.

2. The electronic device of claim 1, wherein the memory further stores an instruction configured such that, after the transmission cycle is changed to the second cycle, the transmission cycle gradually becomes longer than the second cycle.

3. The electronic device of claim 1, wherein, if the triggering event is a user behavior, it is determined that the scan frequency needs to be adjusted, and, if the triggering event is a notification from an application or a message or a call received from an external device, it is determined that the scan frequency does not need to be adjusted.

4. The electronic device of claim 3, wherein the behavior is pressing a key configured on the electronic device, a touch gesture regarding the display, opening a cover for protecting the display, or separating an electronic pen from the electronic device.

5. The electronic device of claim 1, wherein the electronic device further comprises a camera module; if the triggering event is a user input for displaying an image taken by the camera module, it is determined that the scan frequency does not need to be adjusted; and, if the triggering event is a user input for displaying a lock screen, it is determined that the scan frequency needs to be adjusted.

6. The electronic device of claim 1, wherein the electronic device further comprises a camera module; if the triggering event is a first user input for displaying a lock screen, it is determined that the scan frequency does not need to be adjusted; and the memory further stores an instruction that configured such that, if a second user input recognized while the lock screen is displayed on the display is for switching from the lock screen to a different screen, it is determined that the scan frequency needs to be adjusted, and an instruction configured such that, if the second user input is for displaying an image taken by the camera module, it is determined that the scan frequency does not need to be adjusted.

7. The electronic device of claim 1, wherein the memory further stores an instruction configured such that, if the display is turned off; or if a predetermined time elapses after the transmission cycle of the scan signal changes from the first cycle to the second cycle, the transmission cycle of the scan signal is adjusted to the first cycle.

8. The electronic device of claim 1, wherein the electronic device further comprises a cellular module, and, if the triggering event is a message or a call received through the cellular module from a contact known to the electronic device, it is determined that the scan frequency needs to be adjusted.

9. The electronic device of claim 1, wherein, if the triggering event is a notification from an application that is stored in the memory and can be executed by the processor, and if the notification is related to a schedule, it is determined that the scan frequency needs to be adjusted.

10. An electronic device comprising:
a display;
a short-range wireless communication circuit configured to repeatedly transmit a scan signal for finding an access point;
a processor electrically connected to the communication circuit; and
a memory electrically connected to the processor, wherein the memory stores instructions that, when executed, cause the processor to:
when a first screen is displayed on the display after the display is turned on in a state where wireless a connection between the electronic device and the access point is not established, set a transmission cycle of the scan signal to a first cycle, and
when a second screen different from the first screen is displayed on the display after the display is turned on in a state where the wireless connection between the electronic device and the access point is not established, set the transmission cycle of the scan signal to a second cycle shorter than the first cycle.

11. The electronic device of claim 10, wherein the first screen to is a lock screen.

12. The electronic device of claim 10, wherein the second screen is a home screen comprising an icon corresponding to an application, or a screen finally displayed on the display right before the display is turned on.

13. The electronic device of claim 10, wherein the electronic device further comprises a camera module, and the memory further stores an instruction configured such that, if the first screen to be displayed when the display is turned on comprises an image taken by the camera module, the transmission cycle of the scan signal is set to be the first cycle.

14. The electronic device of claim 10, wherein the memory further stores an instruction configured such that, after the transmission cycle is changed to the second cycle, the transmission cycle gradually becomes longer than the second cycle.

15. A method for scanning an access point by an electronic device, the method comprising:
periodically transmitting a scan signal for finding an access point at a first cycle;
determining, if a display is turned on, whether a scan frequency needs to be adjusted or not based on a type of a triggering event that has triggered turning-on of the display;
maintaining the transmission cycle at the first cycle, if the scan frequency does hot need to be adjusted; and
changing the transmission cycle to a second cycle that is shorter than the first cycle, if the scan frequency needs to be adjusted.

* * * * *